US009684828B2

(12) United States Patent
Sung et al.

(10) Patent No.: US 9,684,828 B2
(45) Date of Patent: Jun. 20, 2017

(54) ELECTRONIC DEVICE AND EYE REGION DETECTION METHOD IN ELECTRONIC DEVICE

(71) Applicants:Samsung Electronics Co., Ltd., Gyeonggi-do (KR); Industry-Academic Cooperation Foundation, Yonsei University, Seoul (KR)

(72) Inventors: Woon-Tahk Sung, Seoul (KR); Jae-Hee Kim, Seoul (KR); Byung-Jun Son, Seoul (KR); Kang-Ryoung Park, Seoul (KR); Taek-Seong Jeong, Gyeonggi-do (KR); Dong-Ik Kim, Seoul (KR)

(73) Assignees: Samsung Electronics Co., Ltd (KR); Industry-Academic Cooperation Foundation, Yonsei University (KR)

( * ) Notice: Subject to any disclaimer, the term of this patent is extended or adjusted under 35 U.S.C. 154(b) by 239 days.

(21) Appl. No.: 14/324,913

(22) Filed: Jul. 7, 2014

(65) Prior Publication Data

US 2015/0009314 A1      Jan. 8, 2015

(30) Foreign Application Priority Data

Jul. 4, 2013      (KR) ........................ 10-2013-0078407

(51) Int. Cl.
*G06K 9/00*      (2006.01)
*H04N 5/33*      (2006.01)
*G06K 9/62*      (2006.01)

(52) U.S. Cl.
CPC ....... *G06K 9/00604* (2013.01); *G06K 9/0061* (2013.01); *G06K 9/00597* (2013.01); *G06K 9/6289* (2013.01); *H04N 5/33* (2013.01)

(58) Field of Classification Search
CPC .......... G06K 9/00597; G06K 9/00604; G06K 9/0061; G06K 9/6289; H04N 5/33
(Continued)

(56) References Cited

U.S. PATENT DOCUMENTS 5,859,921 A * 1/1999 Suzuki ............... G06K 9/00268
382/118
5,933,527 A * 8/1999 Ishikawa ............ G06K 9/00268
382/118

(Continued)

FOREIGN PATENT DOCUMENTS

KR        10-0374708 B1      2/2003
KR    10-2010-0119420 A     11/2010

OTHER PUBLICATIONS

Kim et al., Rapid eye detection method for non-glasses type 3D display on portable devices, IEEE Transactions on Consumer Electronics (vol. 56, Issue: 4), pp. 2498-2505, Nov. 2010.*

*Primary Examiner* — Francis G Geroleo
(74) *Attorney, Agent, or Firm* — The Farrell Law Firm, P.C.

(57) ABSTRACT

A method and an electronic device are provided in association with iris recognition. The electronic device includes a camera module that obtains a Near-Infrared Ray (NIR) image, and a controller that converts the NIR image into an integral image, detects at least one candidate eye region from the integral image using at least one mask, detects a pupil region and an eyebrow region from the at least one candidate eye region, and to detect an eye region based on the pupil region.

13 Claims, 8 Drawing Sheets

(58) Field of Classification Search
USPC .......................................................... 348/78
See application file for complete search history.

(56) References Cited

U.S. PATENT DOCUMENTS

| | | | | |
|---|---|---|---|---|
| 7,099,510 B2* | 8/2006 | Jones | ................... | G06K 9/6256 348/142 |
| 7,239,726 B2* | 7/2007 | Li | ...................... | G06K 9/00597 382/117 |
| 8,520,093 B2* | 8/2013 | Nanu | ................. | G06K 9/00248 348/224.1 |
| 2003/0118217 A1* | 6/2003 | Kondo | ............... | G06K 9/00604 382/117 |
| 2004/0146187 A1* | 7/2004 | Jeng | ................... | G06K 9/00281 382/117 |
| 2004/0213476 A1* | 10/2004 | Luo | ...................... | G06K 9/0061 382/254 |
| 2005/0094854 A1* | 5/2005 | Kim | ................... | G06K 9/00261 382/118 |
| 2007/0122036 A1* | 5/2007 | Kaneda | ............... | G06K 9/00281 382/190 |
| 2007/0160308 A1* | 7/2007 | Jones | ................... | G06K 9/0061 382/260 |
| 2008/0069410 A1* | 3/2008 | Ko | ........................ | G06K 9/0061 382/117 |
| 2008/0159600 A1 | 7/2008 | Cho | | |
| 2008/0175447 A1* | 7/2008 | Kim | ................... | G06K 9/00288 382/118 |
| 2010/0220925 A1* | 9/2010 | Ikeda | ................. | G06K 9/00248 382/165 |
| 2010/0290668 A1* | 11/2010 | Friedman | ........... | G06K 9/00604 382/103 |
| 2012/0020514 A1* | 1/2012 | Sawai | ................... | G06K 9/6267 382/103 |
| 2014/0133743 A1* | 5/2014 | Cheon | ................. | G06K 9/3233 382/159 |

* cited by examiner

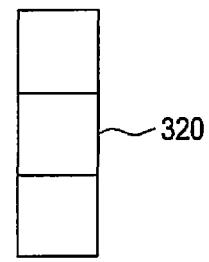
FIG.3A              FIG.3B
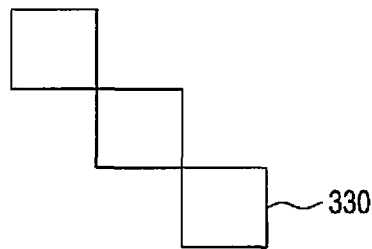
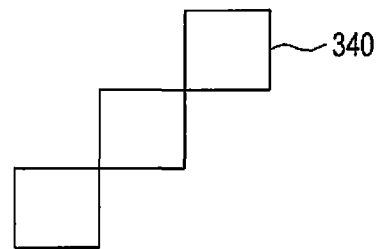
FIG.3C              FIG.3D $$\left(\boxed{A_2}-\boxed{B_2}\right)+\left(\boxed{C_2}-\boxed{B_2}\right) > \text{Threshold 2}$$

$$\left(\boxed{A_3} - \boxed{B_3}\right) + \left(\boxed{C_3} - \boxed{B_3}\right) > \text{Threshold 3}$$

$$\left(\boxed{A_4} - \boxed{B_4}\right) + \left(\boxed{C_4} - \boxed{B_4}\right) > \text{Threshold 4}$$

ELECTRONIC DEVICE AND EYE REGION DETECTION METHOD IN ELECTRONIC DEVICE

PRIORITY

This application claims priority under 35 U.S.C. §119(a) to Korean Patent Application Serial No. 10-2013-0078407, which was filed in the Korean Intellectual Property Office on Jul. 4, 2013, the entire content of which is incorporated herein by reference.

BACKGROUND OF THE INVENTION

1. Field of the Invention

The present disclosure relates generally to an electronic device and an eye region detecting method.

2. Description of Related Art

Recently, technologies based on biometrics have been widely applied to electronic devices. The biometric technology is a technology that measures physical and behavioral characteristics of humans through an automated device, and utilizes the measured data for personal identification. The biometric technology may recognize physical characteristics, for example, a fingerprint, a palm print, a face, the shape of a hand, an iris, a vein, and the like, so as to utilize the recognized data as a means of personal identification.

The iris recognition of the biometric technology is a technology that recognizes an iris that has a unique pattern for each person. The iris of a person has features that do not change over the course of their life and is unique to that person, and, thus, iris recognition is an actively conducted biometric technology. Also, the iris recognition has a faster processing rate and a higher reliability and recognition rate than other biometric technologies and, thus, may be acknowledged as an important branch of biometric technology.

In order to apply iris recognition to a portable electronic device such as a mobile phone and the like, there is a need for a technology which can detect an eye region from a high-definition facial image in real time.

However, the conventional method of detecting the eye region from the high-definition facial image in real-time, requires the use of expensive equipment and it is further inconvenient to obtain an image. As a result, the technology has not been widely utilized for portable electronic devices but has been frequently used for a field that requires security.

Examples of the conventional eye region detection technologies include an eye region detection technology using the AdaBoost algorithm, a rapid eye detection that uses the brightness of an eye region and the surrounding region, and the like. However, the conventional eye region detection technologies require a great amount of algorithm operation and thus, have difficulty in detecting an eye from a high-definition facial image in a mobile environment in real time.

SUMMARY

The present disclosure has been made to address at least the problems and disadvantages described above, and to provide at least the advantages described below. Accordingly, an aspect of the present disclosure is to provide an electronic device that detects, with a few operations, an eye region from a high-definition facial image in real time in a mobile environment, and an eye region detection method implemented in an electronic device.

In accordance with an aspect of the present disclosure, there is provided an electronic device. The electronic device includes a camera module that obtains a Near-Infrared Ray (NIR) image, and a controller that converts the NIR image into an integral image, detects at least one candidate eye region from the integral image using at least one mask, detects a pupil region and an eyebrow region from the at least one candidate eye region, and to detect an eye region based on the pupil region.

In accordance with another aspect of the present disclosure, there is provided a method of detecting an eye region in an electronic device. The method includes obtaining a Near-Infrared Ray (NIR) image, converting the NIR image into an integral image, detecting at least one candidate eye region from the integral image using at least one mask, detecting a pupil region and an eyebrow region from the candidate eye region, and detecting an eye region based on the pupil region.

BRIEF DESCRIPTION OF THE DRAWINGS

The above and other aspects, features, and advantages of the present disclosure will be more apparent from the following detailed description taken in conjunction with the accompanying drawings, in which:

FIGS. 3A-3D are examples of a mask for detecting a candidate eye region according to an embodiment of the present disclosure;

DETAILED DESCRIPTION OF EMBODIMENTS OF THE PRESENT INVENTION

Figure 1:
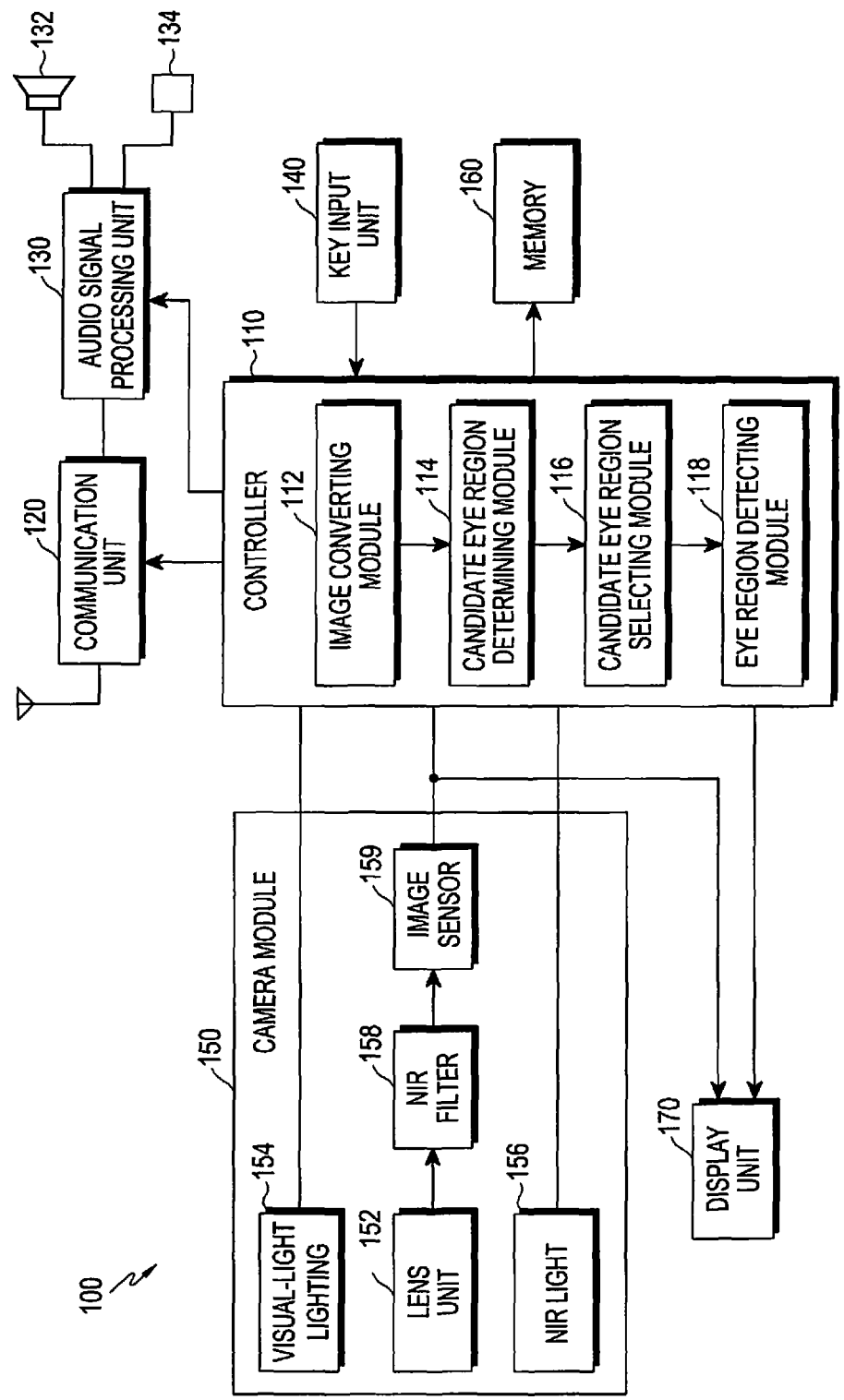
FIG. 1 is a block diagram of a portable terminal according to an embodiment of the present disclosure.

Hereinafter, various embodiments of the present disclosure will be described in detail. First, terms used in the various embodiments of the present disclosure will be briefly described.

With respect to the terms in the various embodiments of the present disclosure, the general terms which are currently and widely used are selected in consideration of functions of structural elements in the various embodiments of the present disclosure. However, meanings of the terms may be changed according to intention, a judicial precedent, appearance of a new technology, and the like. In addition, in certain cases, a term which is not commonly used may be selected. In such a case, the meaning of the term will be described in detail at the corresponding part in the description of the present disclosure. Therefore, the terms used in the various embodiments of the present disclosure should be defined based on the meanings of the terms and the descriptions provided herein.

In various embodiments of the present disclosure, when a part "includes" a component element, it does not mean excluding other component elements but it shall be construed that one or more other components can be included unless they are specifically described to the contrary. Also, terms, such as "unit", "module", or the like, mean a unit for processing at least a function or an operation, and may be embodied through hardware, software, or a combination hardware and software.

Hereinafter, the various embodiments of the present disclosure will be described in detail with reference to accompanying drawings. However, the present disclosure is not restricted by the various embodiments, and is not limited to the embodiments. The same reference numerals represented in each of the drawings indicate elements that perform substantially the same functions.

According to an embodiment of the present disclosure, an electronic device is a portable terminal such as a smart phone, and the like.

FIG. 1 is a block diagram of the portable terminal according to an embodiment of the present disclosure.

Referring to FIG. 1, a portable terminal 100 (hereinafter, also referred to as a 'device') includes a controller 110, a communication unit 120, an audio signal processing unit 130, a key input unit 140, a camera module 150, a memory 160, and a display unit 170.

The controller 110 may be a Central Processor Unit (CPU). The controller 110 may include a Digital Signal Processor (DSP), and includes a Read Only Memory (ROM) in which a control program for a control of the portable terminal 100 is stored, and a Random Access Memory (RAM) which stores a signal or data input from the outside of the portable terminal 100 or is used as a storage area for a task executed in the portable terminal 100. The CPU may include a single core type CPU, a dual core type CPU, a triple core type CPU, or a quad core type CPU. The CPU, the RAM and the ROM are connected with each other through internal buses.

The controller 110 controls the communication unit 120, the audio signal processing unit 130, the key input unit 140, the memory 160, and the display unit 170. That is, the controller 110 executes a general control function associated with the portable terminal 100, and controls a signaling flow among components.

In particular, according to an embodiment of the present disclosure, the controller 110 obtains a Near-Infrared Ray (NIR) image, and executes a control for detecting an eye region using the obtained NIR image. In particular, the controller 110 includes an image converting module 112, a candidate eye region determining module 114, a candidate eye region selecting module 116, and an eye region detecting module 118, and executes a control for detecting an eye region using the image converting module 112, the candidate eye region determining module 114, the candidate eye region selecting module 116, and the eye region detecting module 118.

The image converting module 112 reduces the obtained NIR image, and converts the reduced NIR image into an integral image.

The candidate eye region determining module 114 detects at least one candidate eye region from the integral image using at least one predetermined mask, for example, a first mask through a fourth mask.

The candidate eye region selecting module 116 detects a part that is relatively darker than the other parts from the at least one candidate eye region as a pupil region and an eyebrow region, and selects a final candidate eye region from the at least one candidate eye region using a geometric relation between the pupil region and the eyebrow region.

The eye region detecting module 118 detects a pupil region from the final candidate eye region, and detects an eye region by enlarging a detected eye region area based on the pupil region.

The communication unit 120 connects the portable terminal 100 with an external device. The 'external device' includes a different device from the display device 100, a portable phone, a smart phone, a tablet PC, and a server. The communication unit 120 enables the portable terminal 100 to be connected with the external device through mobile communication by using one antenna or a plurality of antennas according to a control of the controller 110. The mobile communication module 120 transmits/receives a wireless signal for voice communication, image communication, text message (SMS), or multimedia message (MMS) to/from a portable phone of which the phone number is input to the portable terminal 100, a smart phone, a tablet PC, or other devices. The communication unit 120 may further include at least one of a wireless LAN module and a short-range communication module. The wireless LAN module is connected to the Internet according to a control of the controller 110 in a place where a wireless Access Point (AP) is installed. The wireless LAN module supports the wireless LAN standard (IEEE802.11x) of the Institute of Electrical and Electronic Engineers (IEEE). The short-range communication module performs short range communication wirelessly between the portable terminal 100 and an image forming apparatus according to a control of the controller 110. The short range communication scheme may include, for example, Bluetooth and Infrared Data Association (IrDA) communication, and the like.

The audio signal processing unit 130 converts a digital audio signal into an analog audio signal, and outputs the analog audio signal through the speaker 132, and receives an analog audio signal through a microphone 134 and converts the analog audio signal into a digital audio signal.

The speaker 132 outputs various sounds corresponding to various signals (for example, a wireless signal, a digital audio file, a digital video file, or a file photographing signal, and the like) of the communication unit 120 or the camera module 150, based on a control of the controller 110. The speaker 132 outputs sounds (for example, a button control sound or a ring back tone corresponding to phone communication) corresponding to functions executed by the portable terminal 100. One or more speakers 132 may be formed at an appropriate position or positions of the housing of the portable terminal 100. The microphone 134 is capable of receiving an input of voice or sound to generate electric signals under a control of the controller 110.

The key input unit 140 includes at least one key including a power key, a home key, a volume key, a camera key, and the like, and receives a key input from a user to control the portable terminal 100. The key input unit 140 includes a physical keypad formed in the portable terminal 100 and a virtual keypad displayed on the display unit 170.

The camera module 150 photographs a still image or a video based on a control of the controller 110. The camera module 150 may include a plurality of cameras. An embodiment of the present disclosure will be described for a case in which a single camera is used.

The camera module 150 includes a lens unit 152, a visible-light lighting 154, a Near-Infrared Ray (NIR) light 156, an NIR filter, and an image sensor 159.

The lens unit 152 adjusts the focus of the lens to a predetermined setting value, and transmits an optical signal reflected from a subject, in response to a photographing control signal from the controller 110.

The visible-light lighting 154 is formed of a visible-light Light Emitting Diode (LED), and the like, and is turned on or off in response to a general photographing control signal from the controller 110. The visible-light lighting 154 emits light of a visual-light band with respect to a subject, when it is turned on. The general photographing control signal is a signal for general photographing. For example, the visual-light band may be a predetermined wavelength band, for example, a wavelength band of 380 nm through 750 nm.

The NIR light 156 is formed of an NIR Light Emitting Diode (LED) and the like, and is turned on or off in response to an NIR photographing control signal from the controller 110. The NIR light 156 emits light of an NIR band with respect to a subject, when it is turned on. The NIR photographing control signal is a signal for NIR photographing. For example, the NIR band may be a predetermined wavelength band, for example, a wavelength band of 750 nm through 1000 nm.

The NIR filter 158 passes an optical signal of the NIR band among optical signals that are incident through the lens unit 152 after being reflected from a subject.

The image sensor 159 converts, into image signals, optical signals that are received after being transmitted through the lens unit 152, and output the image signals for general photographing. For NIR photographing, the image sensor 159 converts, into NIR image signals, optical signals of the NIR band that pass through the NIR filter 158 among optical signals that are received after being transmitted through the lens unit 152, and outputs the NIR image signals. The camera module 150 may be disposed on a front side or a back side of the portable terminal 100.

The memory unit 160 stores input/output signals or data to correspond to the operations of the communication unit 120, the audio signal processing unit 130, the key input unit 140, the camera module 150, and the display unit 170, based on a control of the controller 110.

The term 'memory' includes the memory 160, a ROM or a RAM included in the controller 110, or a memory card installed in the portable terminal 100, for example, an SD card and a memory stick. The memory may include a non-volatile memory, a volatile memory, a Hard Disc Drive (HDD) or a Solid State Drive (SSD).

The display unit 170 includes a touch screen or the like, and provides a user with user interfaces corresponding to various services (for example, calling, data transmission, broadcasting, photographing). When the display unit 170 is a touch screen, the display unit 170 receives at least one touch through a body part (for example, a finger including a thumb) or a touchable input device (for example, a stylus pen). Also, the display unit 170 displays a preview screen based on a control of the controller 110, and displays an eye region detection result screen based on a control of the controller 110, according to an embodiment of the present disclosure. Also, the display unit 170 displays an iris-recognition execution screen using an eye region detection result, based on a control of the controller 110.

Figure 2:
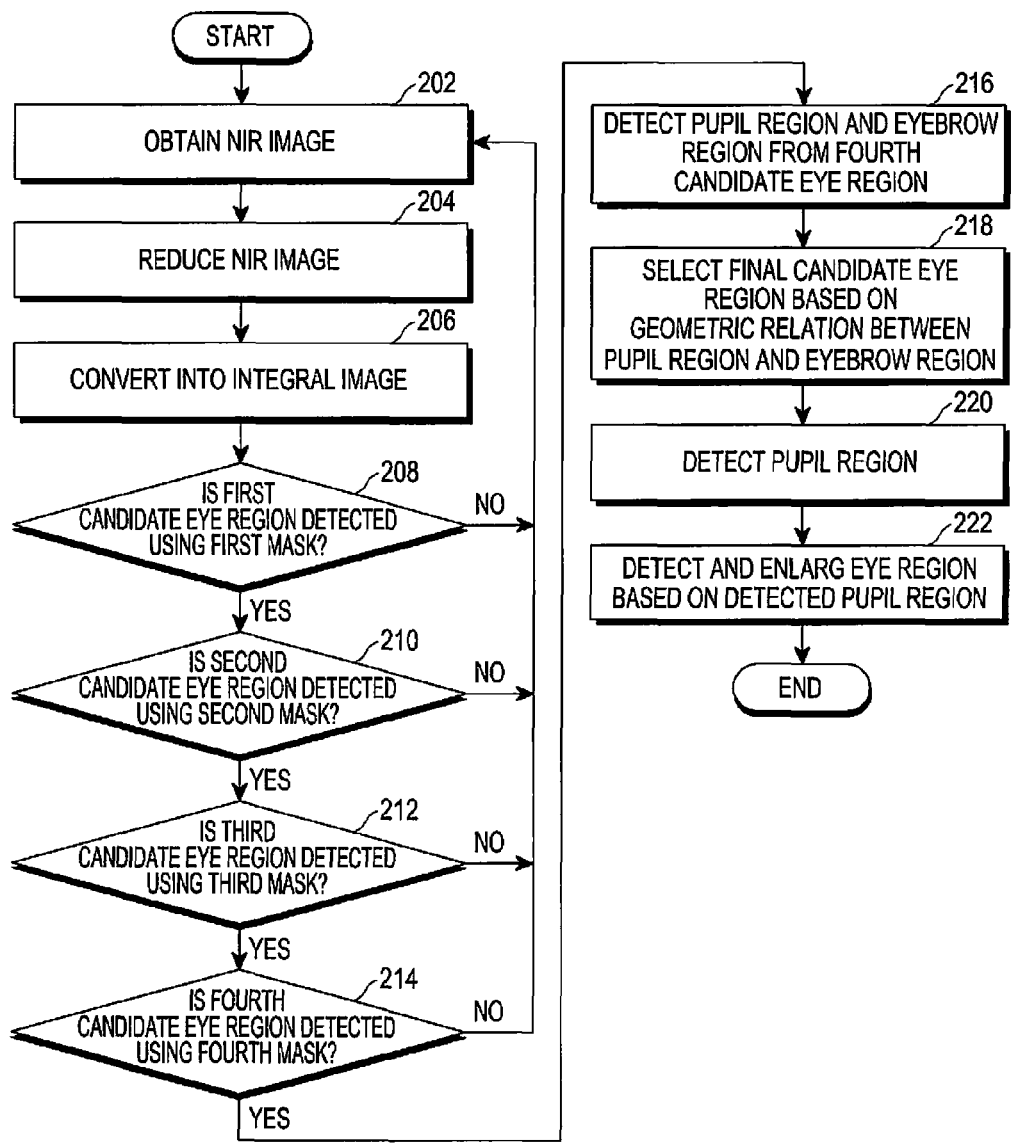
FIG. 2 is a flowchart of an eye region detection method in a portable terminal according to an embodiment of the present disclosure.

FIG. 2 is a flowchart of an eye region detection method in a portable terminal according to an embodiment of the present disclosure.

Referring to FIG. 2, the portable terminal 100 drives the camera module 150 so as to obtain an NIR image in step 202.

For example, the portable terminal 100 turns on the NIR light 156 so as to emit light of an NIR band with respect to a subject, for example, a face, and receives an input of an optical signal reflected from the face through the lens unit 152. Also, the portable terminal 100 converts, into an NIR image signal through the image sensor 159, an optical signal of the NIR band that passes through the NIR filter 158, among optical signals that are incident through the lens unit 152, after being reflected from the face, and obtains an NIR facial image signal.

In this example, when a resolution of the camera module 150 is 1280×960 pixels, the NIR image is photographed at a predetermined distance between the face and the camera, for example, 20 cm, so as to photograph the best image of the face. In the case when the resolution of the camera module 150 is 1280×960 pixels, when the face is photographed at a distance of 20 cm, a diameter of an iris included in the face has a value of 170 through 200 pixels. The iris diameter of 170 through 200 pixels is a minimum size that allows for iris recognition. In addition, the distance between the face and the camera may vary based on the resolution of the camera module 150, and the minimum iris diameter may have a different value.

When the NIR image is obtained, the portable terminal 100 reduces the obtained NIR image in step 204, and converts the reduced NIR image into an integral image in step 206.

For example, the portable terminal 100 executes a sampling of 1 pixel per 3 pixels, vertically and horizontally, with respect to the obtained NIR image, so as to reduce the obtained NIR image to an ⅑ sized NIR image, and converts the reduced NIR image into an integral image in which values corresponding to a predetermined region of the reduced NIR image become coordinate values.

In this example, a total amount of algorithm operation is reduced through use of the integral image, since it is efficient to obtain a sum of pixel values of a predetermined region. Also, as the obtained NIR image has a higher resolution, the number of operations associated with the process of converting the NIR image into an integral image increases. Therefore, when the NIR image is reduced before being converted into an integral image, the number of operations associated with the conversion is decreased.

After the conversion into the integral image, the portable terminal 100 determines whether a first candidate eye region is detected from the integral image using a first mask in step 208. If the first candidate eye region is detected using the first mask, then the portable terminal 100 determines whether a second candidate eye region is detected from the integral image using a second mask in step 210. If the second candidate eye region is detected using the second mask, then the portable terminal 100 determines whether a third candidate eye region is detected from the integral image using a third mask in step 212. If the third candidate eye region is detected using the third mask, then the portable terminal 100 determines whether a fourth candidate eye region is detected from the integral image using a fourth mask in step 210. If any of the first through candidate eye regions is not detected, the portable terminal 100 returns to step 202 to obtain an NIR image.

When the fourth candidate eye region is detected, the portable terminal 100 detects a pupil region and an eyebrow region from the fourth candidate eye region in step 216. For example, a part that is relatively darker than the other parts in the fourth candidate eye region is detected as the pupil region and the eyebrow region.

In step 218, the portable terminal 100 selects a final candidate eye region, from the fourth candidate eye region, based on a geometric relation between the pupil region and the eyebrow region in step 218. For example, an eyebrow is positioned on an upper side of a pupil, and has a low distance difference in a horizontal axis and has a high distance difference in a vertical axis, and thus, the portable terminal 100 detects an eyebrow region and a pupil region having the above mentioned features from each fourth candidate eye region and selects a candidate eye region in which a pupil region exists under an eyebrow region as the final candidate eye region.

In step 220, the portable terminal 100 detects a pupil region from the final candidate eye region. Also, when the pupil region is detected, the portable terminal 100 detects and enlarges an eye region based on the detected pupil region in step 222.

FIGS. 3A-3D are examples of a mask for detecting a candidate eye region according to an embodiment of the present disclosure.

Referring to FIGS. 3A-3D, the mask for detecting a candidate eye region according to an embodiment of the present disclosure includes first through fourth masks.

FIG. 3A is a first mask 310. The first mask 310 includes three blocks in a horizontal direction, and the three blocks include a main block in the center, a first sub-block on the left side of the main block, and a second sub-block on the right side.

FIG. 3B is a second mask 320. The second mask 320 include three blocks in a vertical direction, and the three blocks include a main block in the center, a first sub-block above the main block, and a second sub-block below the main block.

FIG. 3C is a third mask 330. The third mask 330 includes three blocks in a diagonal direction, and the three blocks include a main block in the center, a first sub-block on the upper left side of the main block, and a second sub-block on the lower right side.

FIG. 3D is a fourth mask 340. The fourth mask 340 include three blocks in a diagonal direction, and the three blocks include a main block in the center, a first sub-block on the upper right side of the main block, and a second sub-block on the lower left side.

According to an embodiment of the present disclosure, and as described above, the portable terminal 100 detects a first candidate eye region from an integral image using the first mask 310 in step 208 of FIG. 2.

Figure 4A:
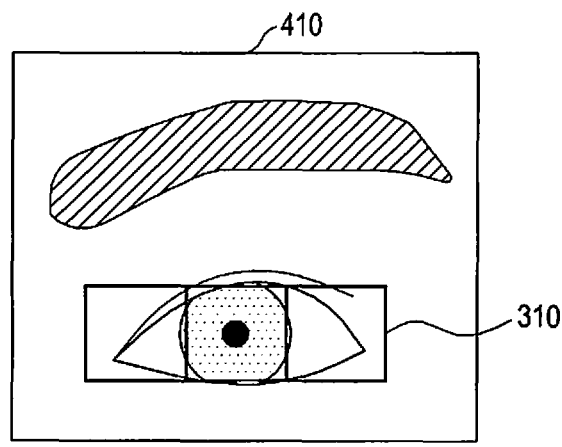
FIGS. 4A and 4B are diagrams illustrating a method of detecting a first candidate eye region using a first mask according to an embodiment of the present disclosure.
Figure 4B:
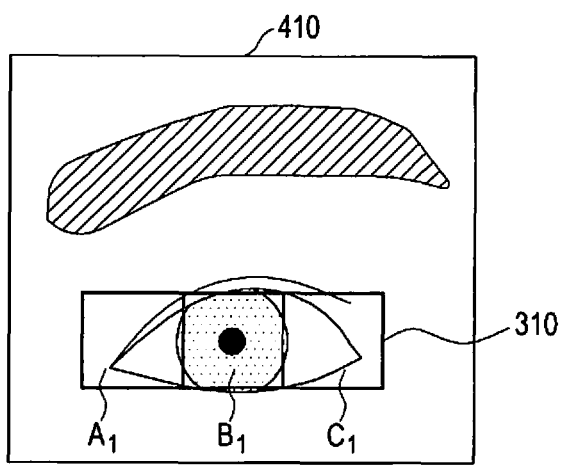

FIGS. 4A-4B 4B are diagrams illustrating a method of detecting a first candidate eye region using the first mask 310 according to an embodiment of the present disclosure.

Referring to FIG. 4A, the portable terminal 100 searches the entire region of an integral image 410 using the first mask 310 (as shown in FIG. 3A).

Referring to FIG. 4B, the portable terminal 100 detects, from the integral image region, a first candidate eye region based on a difference value between an average brightness value of pixels corresponding to a main block $B_1$ of the first mask 310 and an average brightness value of pixels corresponding to each of a first sub-block $A_1$ and a second sub-block $C_1$ of the first mask 310.

For example, in the integral image region, a region of which a sum of the difference value between the average brightness value of pixels of the first sub-block $A_1$ and the average brightness value of pixels of the main block $B_1$, that is $A_1-B_1$, and the difference value between the average brightness value of pixels of the second sub-block $C_1$ and the average brightness value of pixels of the main block $B_1$, that is $C_1-B_1$, is greater than a first threshold value Threshold 1, is detected as the first candidate eye region, i.e. $(A_1-B_1)+(C_1-B_1)>$Threshold 1.

In this example, the main block $B_1$ corresponds to an iris region, the first sub-block $A_1$ corresponds to a region corresponding to a white portion on the left of the iris region, and the second sub-block $C_1$ corresponds to a region corresponding to a white portion on the right of the iris region. The iris region frequently appears to be brighter than the white of an eye in an NIR image based on the positions of a light and a camera and thus, a region of which the sum of the difference value between the average brightness value of pixels of the first sub-block $A_1$ and the average brightness value of pixels of the main block $B_1$ and the difference value between the average brightness value of pixels of the second sub-block $C_1$ and the average brightness value of pixels of the main block $B_1$ is greater than the predetermined first threshold value Threshold 1, is detected as the first candidate eye region. Here, the first candidate eye region may be one or more regions.

Referring back to FIG. 2, when the first candidate eye region is not detected, the portable terminal 100 returns to step 202 and obtains a new NIR facial image. When the first candidate eye region is detected, the portable terminal 100 detects a second candidate eye region from the first candidate eye region using the second mask 320 in step 210.

Figure 5A:
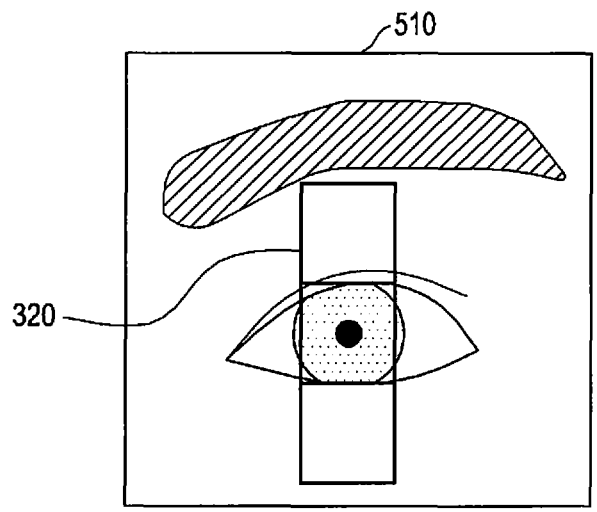
FIGS. 5A and 5B are diagrams illustrating a method of detecting a second candidate eye region using a second mask according to an embodiment of the present disclosure.
Figure 5B:
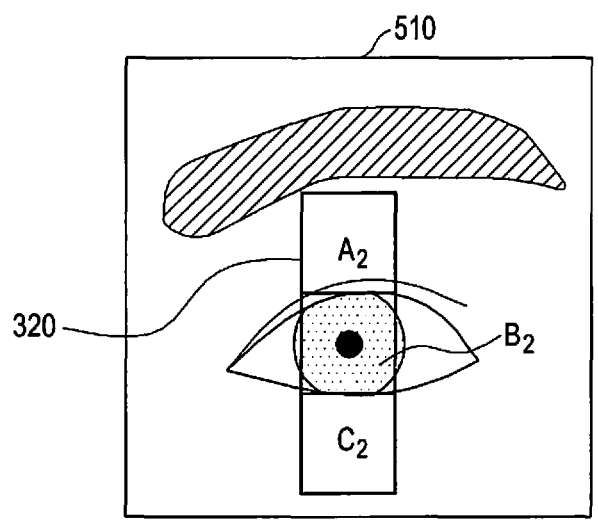

FIGS. 5A-5B are diagrams illustrating a method of detecting a second candidate eye region using the second mask 320 according to an embodiment of the present disclosure.

Referring to FIG. 5A, the portable terminal 100 searches a first candidate eye region 510 using the second mask 320, as shown in FIG. 3.

Referring to FIG. 5B, the portable terminal 100 detects, from the first candidate eye region 510, a second candidate eye region based on a difference value between an average brightness value of pixels corresponding to a main block $B_2$ of the second mask 320 and an average brightness value of pixels corresponding to each of a first sub-block $A_2$ and a second sub-block $C_2$ of the second mask 320.

For example, in the first candidate eye region 510, a region of which a sum of the difference value between the average brightness value of pixels of the first sub-block $A_2$ and the average brightness value of pixels of the main block $B_2$, that is $(A_2-B_2)$, and the difference value between the average brightness value of pixels of the second sub-block $C_2$ and the average brightness value of pixels of the main block $B_2$, that is $C_2-B_2$, is greater than a predetermined second threshold value Threshold 2, is detected as the second candidate eye region, i.e. $(A_2-B_2)+(C_2-B_2)>$Threshold 2.

In this example, the main block $B_2$ corresponds to an iris region, the first sub-block $A_2$ corresponds to an upper eyelid region of the iris region, and the second sub-block $C_2$ corresponds to a lower eyelid region of the iris region. The iris region frequently appears to be brighter than the upper eyelid or the lower eyelid in an NIR image based on the positions of a light and a camera and thus, a region of which the sum of the difference value between the average brightness value of pixels of the first sub-block $A_2$ and the average brightness value of pixels of the main block $B_2$ and the difference value between the average brightness value of pixels of the second sub-block $C_2$ and the average brightness value of pixels of the main block $B_2$ is greater than the predetermined second threshold value Threshold 2 is detected as the second candidate eye region. Here, the second candidate eye region is one or more regions.

Referring back to FIG. 2, when the second candidate eye region is not detected, the portable terminal 100 returns to step 202 and obtains a new NIR facial image. When the second candidate eye region is detected, the portable terminal 100 detects a third candidate eye region from the second candidate eye region using the third mask 330 in step 212.

Figure 6A:
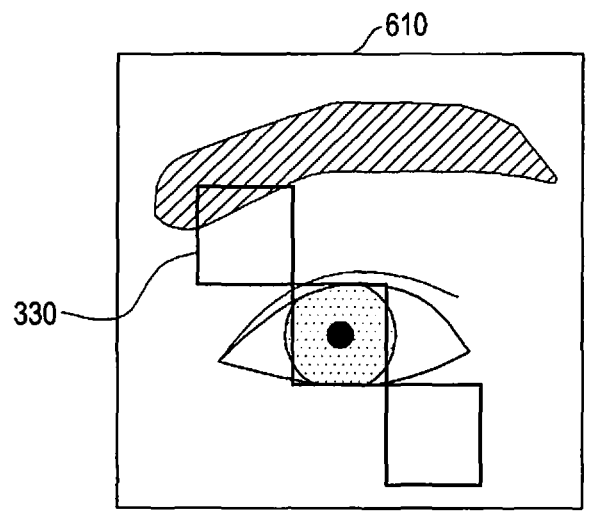
FIGS. 6A and 6B are diagrams illustrating a method of detecting a third candidate eye region using a third mask according to an embodiment of the present disclosure.
Figure 6B:
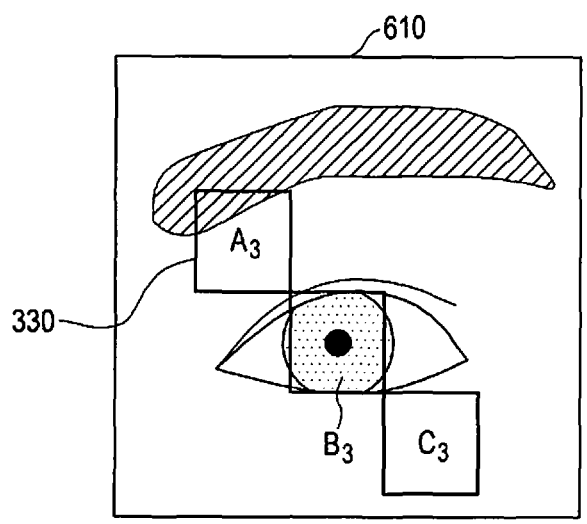

FIGS. 6A-6B are diagrams illustrating a method of detecting a third candidate eye region using the third mask 330 according to an embodiment of the present disclosure.

Referring to FIG. 6A, the portable terminal 100 searches a second candidate eye region 610 using the third mask 330, as shown in FIG. 3.

Referring to FIG. 6B, the portable terminal 100 detects, from the second candidate eye region 610, a third candidate eye region based on a difference value between an average brightness value of pixels corresponding to a main block $B_3$ of the third mask 330 and an average brightness value of pixels corresponding to each of a first sub-block $A_3$ and a second sub-block $C_3$ of the third mask 330.

For example, in the second candidate eye region 610, a region of which a sum of the difference value between the average brightness value of pixels of the first sub-block $A_3$ and the average brightness value of pixels of the main block $B_3$, that is $(A_3-B_3)$, and the difference value between the average brightness value of pixels of the second sub-block $C_3$ and the average brightness value of pixels of the main block $B_3$, that is $(C_3-B_3)$, is greater than a predetermined third threshold value Threshold 3, is detected as the third candidate eye region, i.e. $(A_3-B_3)+(C_3-B_3)>$Threshold 3.

In this example, the main block $B_3$ corresponds to an iris region, the first sub-block $A_3$ corresponds to an upper left eyelid region of the iris region, and the second sub-block $C_3$ corresponds to a lower right eyelid region of the iris region. The iris region frequently appears to be brighter than the upper left eyelid or the lower right eyelid in an NIR image based on the positions of a light and a camera and thus, a region of which the sum of the difference value (between the average brightness value of pixels of the first sub-block $A_3$ and the average brightness value of pixels of the main block $B_3$ and the difference value between the average brightness value of pixels of the second sub-block $C_3$ and the average brightness value of pixels of the main block $B_3$ is greater than the predetermined third threshold value Threshold 3 is detected as the third candidate eye region. Here, the third candidate eye region may be one or more regions.

Referring back to FIG. 2, when the third candidate eye region is not detected, the portable terminal 100 returns to step 202 and obtain a new NIR facial image. When the third candidate eye region is detected, the portable terminal 100 detects a fourth candidate eye region from the third candidate eye region using the fourth mask 330 in step 214.

Figure 7A:
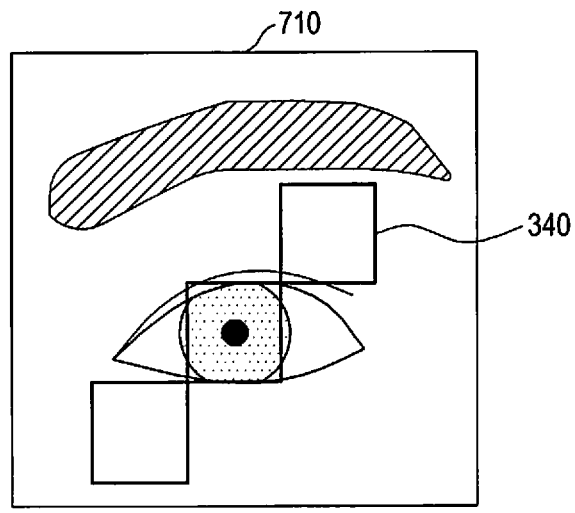
FIGS. 7A and 7B are diagrams illustrating a method of detecting a fourth candidate eye region using a fourth mask according to an embodiment of the present disclosure.
Figure 7B:
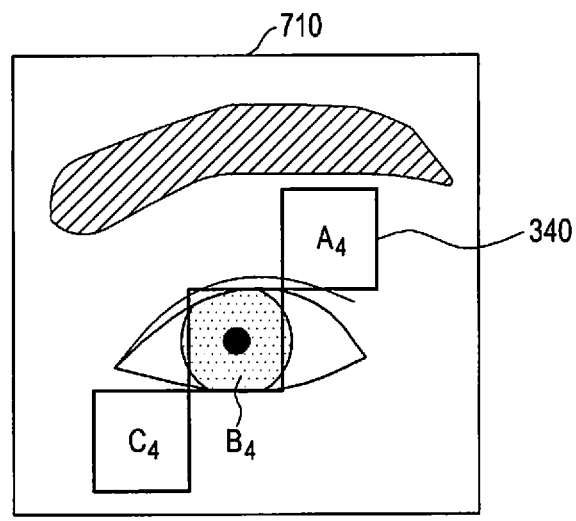

FIGS. 7A-7B are diagrams illustrating a method of detecting a fourth candidate eye region using the fourth mask 340 according to an embodiment of the present disclosure.

Referring to FIG. 7A, the portable terminal 100 searches a third candidate eye region 710 using the fourth mask 340.

Referring to FIG. 7B, the portable terminal 100 detects, from the third candidate eye region 710, a fourth candidate eye region based on a difference value between an average brightness value of pixels corresponding to a main block $B_4$ of the fourth mask 340 and an average brightness value of pixels corresponding to each of a first sub-block $A_4$ and a second sub-block $C_4$ of the fourth mask 340.

For example, in the third candidate eye region 710, a region of which a sum of the difference value between the average brightness value of pixels of the first sub-block $A_4$ and the average brightness value of pixels of the main block $B_4$, that is $(A_4-B_4)$, and the difference value between the average brightness value of pixels of the second sub-block $C_4$ and the average brightness value of pixels of the main block $B_4$, that is $(C_4-B_4)$, is greater than a predetermined fourth threshold value Threshold 4, is detected as the fourth candidate eye region, i.e. $(A_4-B_4)+(C_4-B_4)>$Threshold 4.

In this example, the main block $B_4$ corresponds to an iris region, the first sub-block $A_4$ corresponds to an upper right eyelid region of the iris region, and the second sub-block $C_4$ corresponds to a lower left eyelid region of the iris region. The iris region frequently appears to be brighter than the upper right eyelid or the lower left eyelid in an NIR image based on the positions of a light and a camera and thus, a region of which the sum of the difference value between the average brightness value of pixels of the first sub-block $A_4$ and the average brightness value of pixels of the main block $B_4$ and the difference value between the average brightness value of pixels of the second sub-block $C_4$ and the average brightness value of pixels of the main block $B_4$ is greater than the predetermined fourth threshold value Threshold 4, is detected as the fourth candidate eye region. Here, the fourth candidate eye region may be one or more regions.

Referring back to FIG. 2, when the fourth candidate eye region is not detected, the portable terminal 100 returns to step 202 and obtains a new NIR facial image.

The first through fourth threshold values are set based on a result of a histogram analysis on plenty of eye images.

Figure 8:
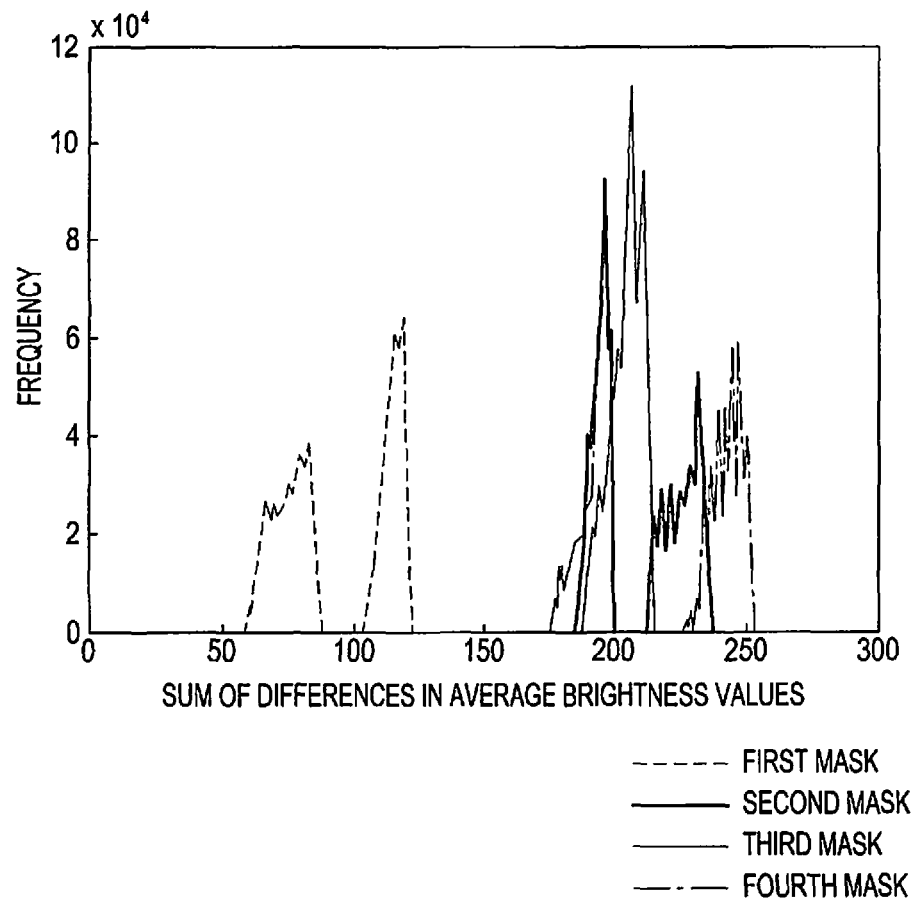
FIG. 8 is a diagram illustrating a histogram of eye images according to an embodiment of the present disclosure.

FIG. 8 is a diagram illustrating a histogram of eye images according to an embodiment of the present disclosure.

Referring to FIG. 8, the histogram shows the distribution of sums of a difference in average brightness values of pixels between a main block and a first sub-block and a difference in average brightness values of pixels between a main block and a second sub-block, obtained by applying the first mask 310 through fourth mask 340 to each of the plurality of eye images.

For example, when the first mask 310 is applied to an integral image, the sum of the differences in the average brightness values is relatively densely distributed in a range of approximately 50-100 and a range of approximately 100-130. Therefore, the first threshold value is set within the range of approximately 50-100 and the range of approximately 100-130.

When the second mask 320 is applied to the first candidate eye region, the sum of the differences in the average brightness values is relatively densely distributed in a range of approximately 190-200 and a range of approximately 210-240. Therefore, the second threshold value is set within the range of approximately 190-200 and the range of approximately 210-240.

When the third mask 330 is applied to the second candidate eye region, the sum of the differences in the average brightness values is relatively densely distributed in a range of approximately 190-220. Therefore, the third threshold value is set within the range of approximately 190-220.

When the fourth mask 340 is applied to the third candidate eye region, the sum of the differences in the average brightness values is relatively densely distributed in a range of approximately 170-220 and a range of approximately 230-260. Therefore, the fourth threshold value is set within the range of approximately 170-220 and the range of approximately 230-260. The first through fourth threshold values are obtained through statistical analysis of the eye images and thus, may be set to other values based on various statistical values.

Figure 9:
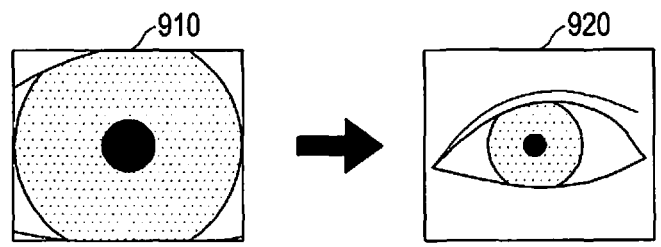
FIG. 9 is a diagram illustrating a method of detecting an eye region based on a pupil region according to an embodiment of the present disclosure.

FIG. 9 is a diagram illustrating a method of detecting an eye region based on a pupil region according to an embodiment of the present disclosure.

Referring to FIG. 9, a detected pupil region 910 is shown. However, in the case of the detected pupil region 910, an iris may not be placed in the center of the pupil region 910 or an iris may be partially included in the pupil region 910 since the size of the iris is large. Therefore, according to an embodiment of the present disclosure, the area of a detected eye region is enlarged by a predetermined ratio, for example, by two-fold, so as to include the entire eye region 920. When the area of the detected eye region is enlarged as described above, the entire iris is included in the detected region 920. Thus, according to an embodiment of the present disclosure, the iris is accurately included in the detected eye region and thus, iris recognition is accurately executed.

According to an embodiment of the present disclosure, an eye region is promptly detected through only a few operations by converting an NIR image into an integral image. According to an embodiment of the present disclosure, an eye region is detected after detecting candidate eye regions from an integral image by sequentially applying a plurality of predetermined masks and thus, it is quicker and requires only a few operations as compared to eye detection through analysis on an entire image. Accordingly, this may enable eye detection from a high-definition facial image in real time in a mobile environment.

The methods according to the various embodiments of the present disclosure may be in a form of program instructions executed through various computer means to be recorded in a computer readable medium. The computer readable medium may include a program command, a data file, a data structure, and the like independently or in combination. The program instruction recorded in the computer-readable medium may be one which is specifically designed and configured for the present disclosure, or may be well-known to and used by a person ordinarily skilled in the art of computer software.

An eye region detection method according to an embodiment of the present disclosure may be implemented in a form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, which are machine (computer) readable storage media, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present disclosure. Accordingly, the present disclosure includes a program for a code implementing the apparatus and method described in the appended claims of the specification and a machine (a computer or the like) readable storage medium for storing the program. Further, the program may be electronically transferred by any communication signal through a wired or wireless connection, and the present disclosure appropriately includes equivalents of the program.

A portable terminal according to the embodiments of the present disclosure may receive the program from a program providing device that is connected by wire or wirelessly with the portable terminal, and may store the program. The program providing device may include a memory for storing a program including instructions to execute a method associated with a recognition operation using iris recognition according to the various embodiments of the present disclosure, a communication unit to perform wired or wireless communication with the portable terminal, and a controller to transmit the program through the communication unit, automatically or in response to the request from the portable terminal.

While the present disclosure has been shown and described with reference to certain embodiments thereof, it will be understood by those skilled in the art that various changes in form and details may be made therein without departing from the spirit and scope of the present disclosure as defined by the appended claims.

What is claimed is:

1. An electronic device, comprising:
   a camera module configured to obtain a Near-Infrared Ray (NIR) image; and
   a controller configured to convert the NIR image into an integral image, detect at least one candidate eye region from the integral image using a plurality of different masks, detect a pupil region and an eyebrow region from the at least one candidate eye region, detect an eye region based on the pupil region, detect a first candidate eye region from the integral image using a first mask of the plurality of different masks, detect a second candidate eye region from the first candidate eye region using a second mask of the plurality of different masks, detect a third candidate eye region from the second candidate eye region using a third mask of the plurality of different masks, and detect a fourth candidate eye region from the third candidate eye region using a fourth mask of the plurality of different masks, and
   wherein the first mask includes, in a horizontal direction, a first main block, a first sub-block on the left of the first main block, and a second sub-block on the right of the first main block,
   the second mask includes, in a vertical direction, a second main block, a first sub-block above the second main block, and a second sub-block below the second main block,
   the third mask includes, in a diagonal direction, a third main block, a first sub-block on the upper left side of the third main block, and a second sub-block on the lower right side of the third main block, and
   the fourth mask includes, in a diagonal direction, a fourth main block, a first sub-block on the upper right side of the fourth main block, and a second sub-block on the lower left side of the fourth main block.

2. The electronic device of claim 1, wherein the controller detects the pupil region from a final candidate eye region selected from the at least one candidate eye region.

3. The electronic device of claim 1, wherein the camera module comprises:
   a lens unit that transmits an optical signal reflected from a subject;
   a Near-Infrared Ray (NIR) light that emits light of a Near-Infrared Ray (NIR) band with respect to a subject;
   a Near-Infrared Ray (NIR) filter that passes an optical signal of the NIR band among optical signals that are incident through the lens unit after being reflected from the subject; and an image sensor that converts, into an NIR image signal, an optical signal of the NIR band that passes through the NIR filter, and outputs the NIR signal.

4. The electronic device of claim 1, wherein the controller is further configured to searches the integral image using the plurality of different masks, calculates a difference value between an average brightness value of pixels corresponding to at least one of the first main block, the second main block, the third main block and the fourth main block and an average brightness value of pixels corresponding to each of the first sub-block and the second sub-block in at least one of the first main block, the second main block, the third main block and the fourth main block in the integral image, and detects, to be the at least one candidate eye region, a region of which the difference value is greater than a predetermined threshold value.

5. The electronic device of claim 1, wherein the controller is further configured to:
   detect a pupil region and the eyebrow region from the detected fourth candidate eye region; and
   select a final candidate eye region based on a geometric relation between the pupil region and the eyebrow region.

6. The electronic device of claim 5, wherein the controller is further configured to enlarges a detected eye region area by a predetermined ratio based on the pupil region, and detects an eye region based on the enlarged detected eye region area.

7. A method of detecting an eye region in an electronic device, the method comprising:
   obtaining a Near-Infrared Ray (NIR) image;
   converting the NIR image into an integral image;
   detecting at least one candidate eye region from the integral image using a plurality of different masks, wherein a first candidate eye region is detected from the integral image using a first mask of the plurality of different masks, a second candidate eye region is detected from the first candidate eye region using a second mask of the plurality of different masks, a third candidate eye region is detected from the second candidate eye region using a third mask of the plurality of different masks, and a fourth candidate eye region is detected from the third candidate eye region using a fourth mask of the plurality of different masks;
   detecting a pupil region and an eyebrow region from the at least one candidate eye region; and
   detecting an eye region based on the pupil region,
   wherein the first mask includes, in a horizontal direction, a first main block, a first sub-block on the left of the first main block, and a second sub-block on the right of the first main block,
   the second mask includes, in a vertical direction, a second main block, a first sub-block above the second main block, and a second sub-block below the second main block,
   the third mask includes, in a diagonal direction, a third main block, a first sub-block on the upper left side of the third main block, and a second sub-block on the lower right side of the third main block, and
   the fourth mask includes, in a diagonal direction, a fourth main block, a first sub-block on the upper right side of the fourth main block, and a second sub-block on the lower left side of the fourth main block.

8. The method of claim 7, wherein the pupil region is detected from a final candidate eye region selected from the at least one candidate eye region.

9. The method of claim 7, further comprising:
   reducing the obtained NIR image by a predetermined ratio.

10. The method of claim 7, wherein detecting the at least one candidate eye region from the integral image using the plurality of different masks comprises:
   searching the integral image using the plurality of different masks;
   calculating a difference value between an average brightness value of pixels corresponding to at least one of the first main block, the second main block, the third main block and the fourth main block and an average brightness value of pixels corresponding to each of the first sub-block and the second sub-block in at least one of the first main block, the second main block, the third main block and the fourth main block, in the integral image; and
   detecting, to be the at least one candidate eye region, a region of which the difference value is greater than a predetermined threshold value.

11. The method of claim 7, wherein detecting the pupil region and the eyebrow region from the at least one candidate eye region comprises:
   detecting the pupil region and the eyebrow region from the detected fourth candidate eye region; and
   selecting a final candidate eye region based on a geometric relation between the pupil region and the eyebrow region.

12. The method of claim 11, wherein detecting the eye region based on the pupil region comprises:
   enlarging a detected eye region area by a predetermined ratio based on the pupil region; and
   detecting the eye region based on the enlarged detected eye region area.

13. The method of claim 12, wherein the predetermined ratio is two-fold.

* * * * *